(12) United States Patent
Ferraris

(10) Patent No.: US 6,453,655 B2
(45) Date of Patent: Sep. 24, 2002

(54) REEL FOR HARVESTING MACHINES

(76) Inventor: Omar Ruben Ferraris, Santiago del Estero 869 - Partido de 9 de Julio - Pcia., de Buenos Aires - (6500) (AR)

( * ) Notice: Subject to any disclaimer, the term of this patent is extended or adjusted under 35 U.S.C. 154(b) by 0 days.

(21) Appl. No.: 09/730,792

(22) Filed: Dec. 7, 2000

(30) Foreign Application Priority Data

Dec. 9, 1999 (AR) .......................................... 990106291

(51) Int. Cl.⁷ .............................................. A01D 57/02
(52) U.S. Cl. ................................ 56/220; 56/219; 56/126
(58) Field of Search ................................. 56/12.4, 12.5, 56/13.5, 14.3, 14.4, 219, 220, 221, 222, 224, 226, 227

(56) References Cited

U.S. PATENT DOCUMENTS

| | | | | |
|---|---|---|---|---|
| 2,317,127 A | * | 4/1943 | Bowling | 56/219 |
| 2,724,942 A | * | 11/1955 | Smith | 56/219 |
| 3,638,408 A | * | 2/1972 | Swanson | 56/219 |
| 4,303,373 A | * | 12/1981 | Polhemus | 415/206 |
| 4,353,201 A | * | 10/1982 | Pierce et al. | 56/130 |
| 5,768,870 A | * | 6/1998 | Talbot et al. | 56/220 |
| 5,867,972 A | * | 2/1999 | Laumann et al. | 56/126 |
| 5,987,861 A | * | 11/1999 | Duncan et al. | 460/142 |
| 6,138,447 A | * | 10/2000 | Silvers et al. | 56/128 |
| 6,170,244 B1 | * | 1/2001 | Coers et al. | 460/142 |
| 6,195,972 B1 | * | 3/2001 | Talbot et al. | 56/220 |

FOREIGN PATENT DOCUMENTS

EP 471961 * 2/1992

* cited by examiner

Primary Examiner—Thomas B. Will
Assistant Examiner—Nathan Mammen
(74) Attorney, Agent, or Firm—Michael D. Bednarek; Shaw Pittman LLP

(57) ABSTRACT

A reel for harvesters of the type including a leading platform with crop cutters and cut-plant collectors and conveyors, the reel comprising a plurality of parallel cross bars rotating around a driving shaft, the bars being driven by end transmission bands at respective ends of the reel, the bands running over wheels arranged in a desired manner to define a desired close path.

19 Claims, 9 Drawing Sheets

REEL FOR HARVESTING MACHINES

BACKGROUND OF THE INVENTION

1. Field of the Invention

The present invention relates to the agricultural field and more particularly refers to a harvesting machine and, even more particularly refers to a novel reel for harvesters for crops like soy, wheat and the like, the harvester being of the type including a front platform with cutting means for cutting the crops and a reel for accommodating the crops towards the cutting means. Most preferably, the machine incorporating the advantages of the invention includes a reel transverse to the moving direction of the machine, the reel including a plurality of cross-bars with paddles or tines to take the crops towards the cutting means, the platform also including crop collecting means for taken the cut crops over the platform and carrying the same into a crop conveying means towards the inner processing cleaning mechanisms of the harvester. Even more particularly, the invention relates to improvements in reels for soy and wheat harvesters wherein the reel can be moved relative to the machine in order to have a desired orientation of the tines or paddles in the cross bars and a desired orientation of the entire reel relative o the platform both orientations for obtaining a better processing of the crops and much more recovering of the cut crops as compared to the prior art harvesters.

2. Description of the Prior Art

As it is well known to any person skilled in the art, the soy or wheat harvesting involves several requirements related to the maturity status of the plants, the humidity content of the plant, the general status of the plant, i.e. whether the plant is erect or tumbled onto the soil, the weather conditions, and several features of the used machine. The evaluation of the results or yields of a harvesting of soy, wheat, oats, barley and rye, for example, may be determined mainly as a function of two types of causes that provoke the looses of crops related to such plants. In effect, such looses may be classified as natural looses due to the plant status, or such looses depending from the equipment status and related to the performance and operation conditions of the machinery used in the harvesting work.

In relation to the natural looses, the soil level i.e. the evenness and unevenness of soil, the plant status i.e. whether they are erect or lying down or tumbled, over the soil, the presence of weeds, low fortification, sheath dehiscence, etc., are taken into account. As to the looses due to the functioning conditions of the machines, these looses relates to the regulation and settings of the several mechanisms of the harvester, the machine design and, particularly, the design and/or operation of the platform, particularly the reel in the platform.

As to the harvester of the type including a reel in a platform, the looses are usually the cause of an incorrect reel regulation or insufficient regulation provided by the reel mechanisms. It is quite common that the reel is excessively high relative to the soil therefore permitting the plants to fall down ahead of the cutting means in the platform without the plants being guided towards the cutting means. If the reel is excessively low the plants are excessively kicked and the grains fall down out of the platform and the grain collecting mechanisms. If the reel is excessively delayed as to the cutting means the plants are cut prematurely, falling down ahead of the platform without the stems of the plant being taken by the proper mechanisms and without the cut plants being carried towards the collector means. If the reel is ahead of the cutting means the plants are not accommodated and retained against the cutting means thus resulting in a lot of plants that are not cut and not collected by the machine. In connection with another aspect, if the paddles or tines of the cross bars are not properly orientated and the rotation speed of the reel is excessive, the plants are taken by the tines and upwardly ejected out of the platform.

Among the known reels, those including cross bars with paddles are quite known. Other reels include bars with retractile tines and bars with unidirectional and parallel tines and bars with angularly movable tines. These tines are considered the better ones for soy harvesting as long as they permit the plants to be positioned entirely erect in front of the cutting means thus providing better harvesting results, higher yields, better cutting and subsequent plant collecting as compared to other reels. However, several drawbacks are suffered not only by all the known reels but also by these type of regulated-tines reels.

Effectively, as it is well known in the art, one of the most important aspects in any harvesting machine is to set the most convenient distance between the cross bars of the reel and the cutting mechanism of the platform in order to get the most appropriate condition of the plant upon cutting thereof by the cutting means. The cutting means, comprising a plurality of cutting knives, is located under the reel and ahead of endless screws for collecting the cut plants and carrying the same towards a central part of the platform wherein the plants are taken by conveyor means for conveying the plants into the machine for processing the plant in order to separate and classify the seeds off the leaves and stems.

The harvesters using rotary reels like the ones disclosed above fail to provide the necessary regulation of the position of the reel relative to the above mentioned remaining mechanisms, particularly relative to the cutting means and the cut-plant collecting endless screws. This poor regulation is due to the fact that the cross bars are fixed to rigid end structures that rotate around a driving shaft and along a circular path. Therefore, the cross bars and their tines move along a circular path that restricts the regulation of the bars and tines as would be desirable, particularly insofar as to the spacing of the tines relative to the cutting means and to collecting means is concerned. Due to this circular path of movement, the bars enter the upper part of the plants crushing and kicking the plants thus provoking the seeds to fall down the soil before the plant reaching the platform. In addition, the circular path can not permit the bars to be as close the endless collector as necessary to prevent the accumulation of cut plants which are left adjacent the collector but at a distance therefrom insufficient to be caught by the collector.

In other words, due to a pure geometrical question, neither the movement paths the tines and the cutting means can be appropriately matched but nor the movement paths of the tines and the endless collector can be accommodated to get the desired results. While the conventional can be moved up and down as well as back and fore, these movements are insufficient to obtain the most convenient position of the several platform components to prevent dead spaces or volumes from being formed between the reel and the cutting means and between the reel and the endless collector. Particularly, the cut plants excessively accumulates in the dead space formed between the conventional reel and the endless collector; when, for any reason, such excessive accumulation of plants are suddenly caught by the endless collector and all the plants are conveyed at the same time into the machine, the internal mechanisms of the machine become blocked and the machine must be stopped and some time is necessary to remove the blocked material and clean the machine before restarting the harvesting works.

It would be therefore convenient to have a new reel system or a machine capable of being positioned and combined with the several mechanisms of a harvesting machine or platform in a way that the above drawbacks be prevented, also providing better crop-harvested results and yields, better and more possibilities of regulating the entire positioning of the reel, the cross bars and tines, depending of the type of plant under harvesting, the status of the plants and other variables.

SUMMARY OF THE INVENTION

It is therefore one object of the present invention to provide a reel for harvesters of the type including a leading platform with crop cutters and cut-plant collectors and conveyors, the reel comprising a plurality of parallel cross bars rotating around a driving shaft, the bars being driven by end transmission bands at respective ends of the reel, the bands running over wheels arranged in a desired manner to define a desired close path.

It is still another object of the present invention to provide a reel for harvesting machines of the type including a leading platform with crop cutting means, the reel comprising
 a first and a second opposite ends,
 at least one driving shaft having opposite ends,
 at least one first set of wheels at each end of the reel, the first set of wheels comprising a driven wheel connected to the driving shaft, and at least one idler wheel,
 at least one transmission band running over the first set of wheels for transmitting motion, and
 a plurality of cross bars extending along the platform and between the ends of the reel, each bar having respective opposite ends, each end being connected to one of said at least one transmission band.

It is a further object of the present invention to provide a reel for harvesting machines of the type having a front platform with crop cutting means, the reel including two opposite ends, the reel comprising:
 at least one first set of two wheels at each end of the reel,
 at least one motion transmission band running over the two wheels for transmitting motion, and
 a plurality of cross bars extending along the platform and between the ends of the reel, each bar having respective opposite ends, each end connected to a band.

It is even another object of the present invention to provide a harvesting machine comprising:
 a front platform,
 a crop cutting means mounted in the platform,
 a reel for manipulating the crops and feeding the same into the cutting means, and
 crop collector means,
 the reel comprising:
  a plurality of cross bars driven by end motion transmission bands at respective ends of the reel, the bands running over wheels arranged in a manner to define a desired close path for the bands and cross bars.

It is also an object of the present invention to provide a novel reel for harvesters which, among its several advantages provides an easy mounting thereof in the platform of the harvesting machine, an accurate and desirable independent regulation of at least three positions of the reel to get the most desirable position thereof relative to the cutting mecha-nism and the endless collector, as well as to achieve a better entering of the reel over the plants together with a perfect leaving of the reel upwardly of the plants once the plants are cut over the platform, whereby any looses of the grains and seeds falling off the platform are prevented.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
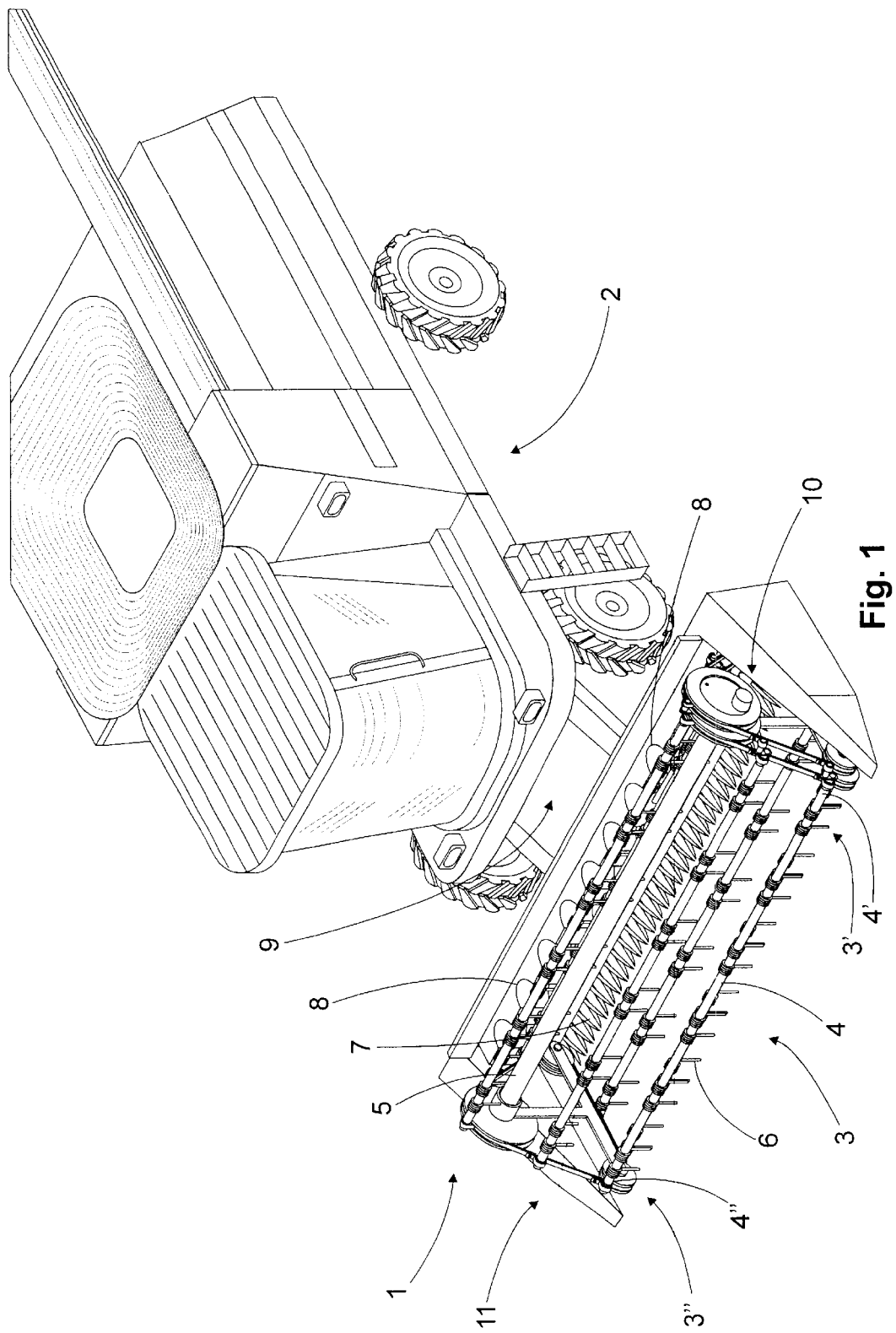
FIG. 1 shows a top perspective view of a harvesting machine incorporating the novel reel of the present invention.

Now referring in detail to the drawings it may be seen from FIG. 1 an agricultural machine, more particularly a harvesting machine, including a leading or front harvesting platform 1 and a rear tractor and plant-processing part 2. Platform 1 is arranged transversely to the movement direction of the machine for cutting the plants, collecting the cut plants and conveying the same into part 2 of the machine. Part 2 includes not only the traction components of the machine but also all the mechanisms to process the cut plants in order to separate the grains and seeds off the leaves, stems, sheathes and other undesirable parts of the plants.

Platform 1 includes rotatably mounted thereon a reel 3 comprising a plurality of peripheral cross bars 4 arranged, according to a preferred embodiment of the invention, around a driving shaft 5. Each cross-bar 4 includes a plurality of tines 6, or conventional paddles (not shown), in order to get a desired smooth handling of the plant during harvesting. Once taken by the cross bars the plant is cut by cutting means formed by a plurality of knives 7 arranged at the bottom and at a leading edge of the platform. A collector 8, preferably comprising a conveying endless screw collector converging to the center of the machine, is arranged at a rear bottom portion of the platform to convey all the cut plants towards an endless conveyor 9 for conveying the plants into the machine.

Figure 12:
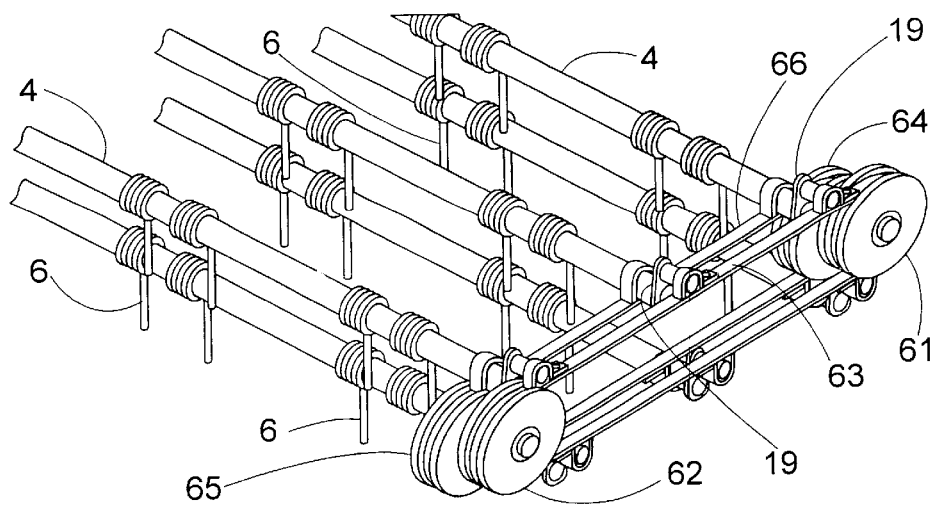
FIG. 12 shows a top-right perspective view of an another embodiment of the reel of the invention, with only two pulleys.

The reel includes a first end 3' and a second opposite end 3" each end including a plurality of wheels 10, 11, and motion transmission bands connected to selected wheels and to cross bars 4 to keep the bars spaced apart from each other at predetermined distances. According to the invention, the wheels are driven by the shaft and the transmission bands, preferably belts or chains (shown in FIG. 14) running over and around the wheels, transfer the motion to the plurality of cross bars with the wheels arranged in a manner to define a desired close path for the bands and cross bars, the closed path or loop being having a triangular configuration while other configurations are possible, as it is shown in FIG. 12. As it will be later described in connection to FIGS. 2 and 4, the bars are connected to the bands in a way to preferably keep the tines oriented as desired, preferably always perpendicular to the ground in order to prevent friction with the plants, kicking and other undesired manipulation, thus, the tines orientation depending of the status of the plant.

Figure 2:
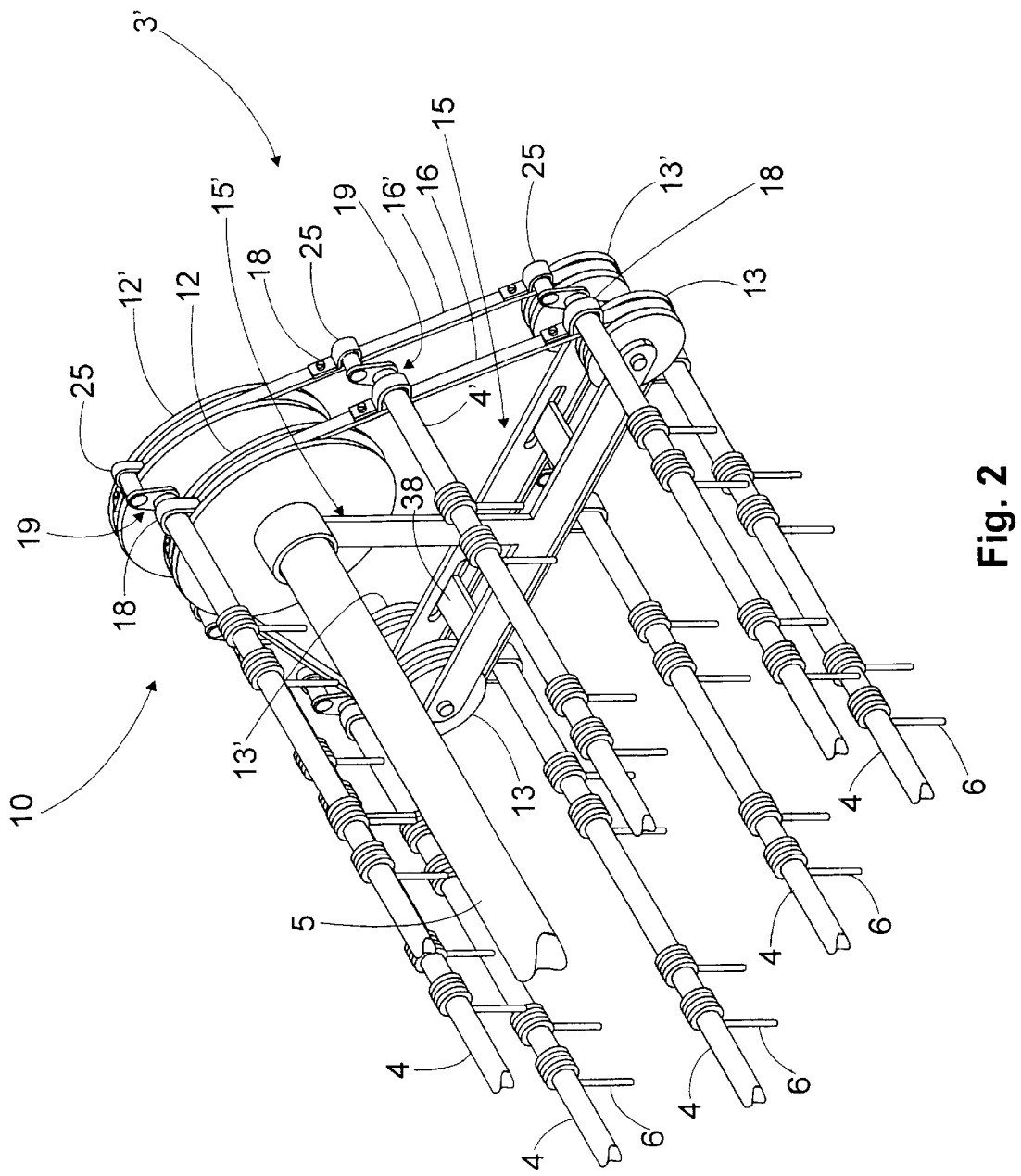
FIG. 2 shows a top-left perspective, partial view of an end of the novel reel of FIG. 1.
Figure 3:
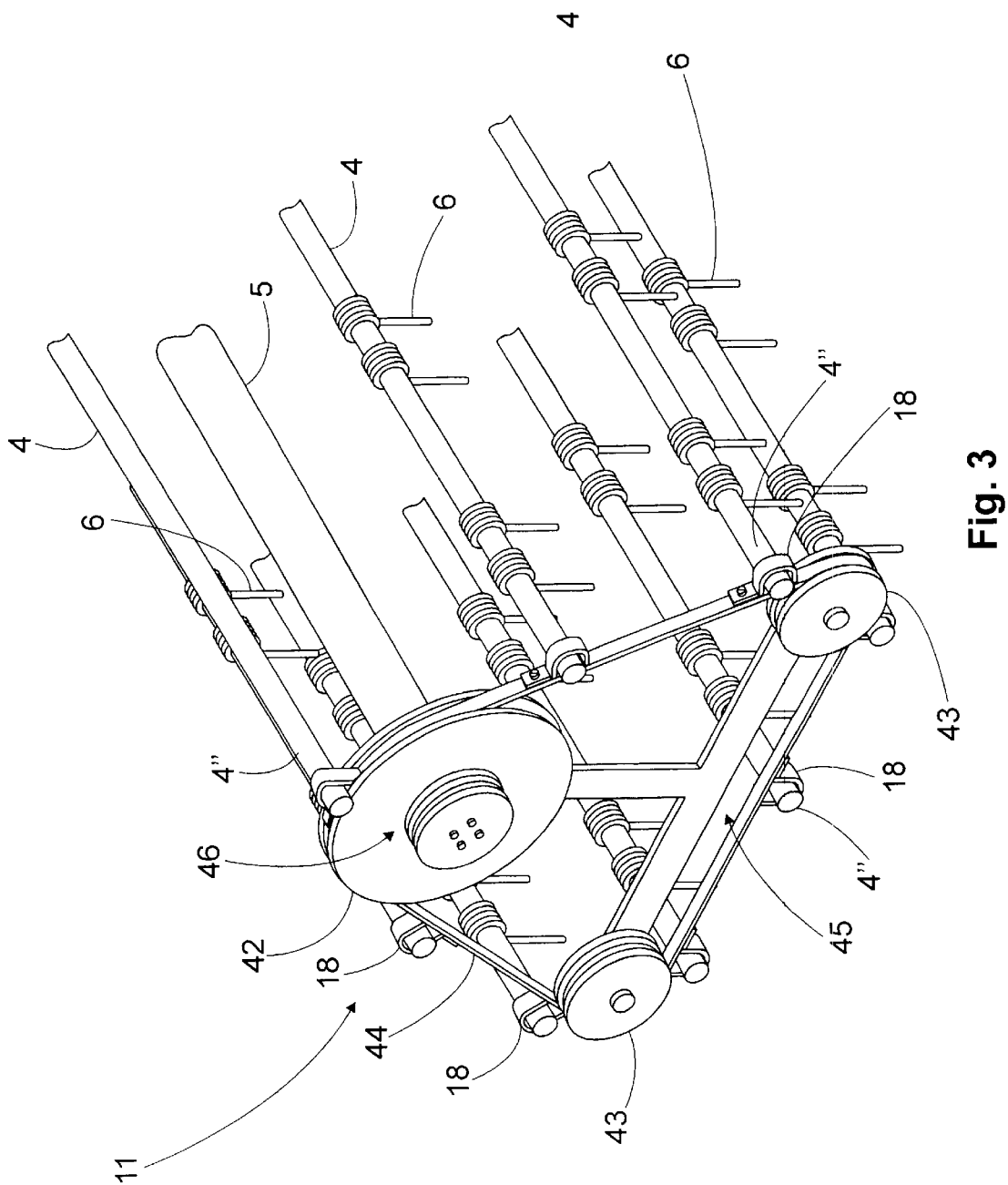
FIG. 3 shows a top perspective, partial view of another end, opposite to the one of FIG. 2, of the novel reel of FIG. 1.
Figure 4:
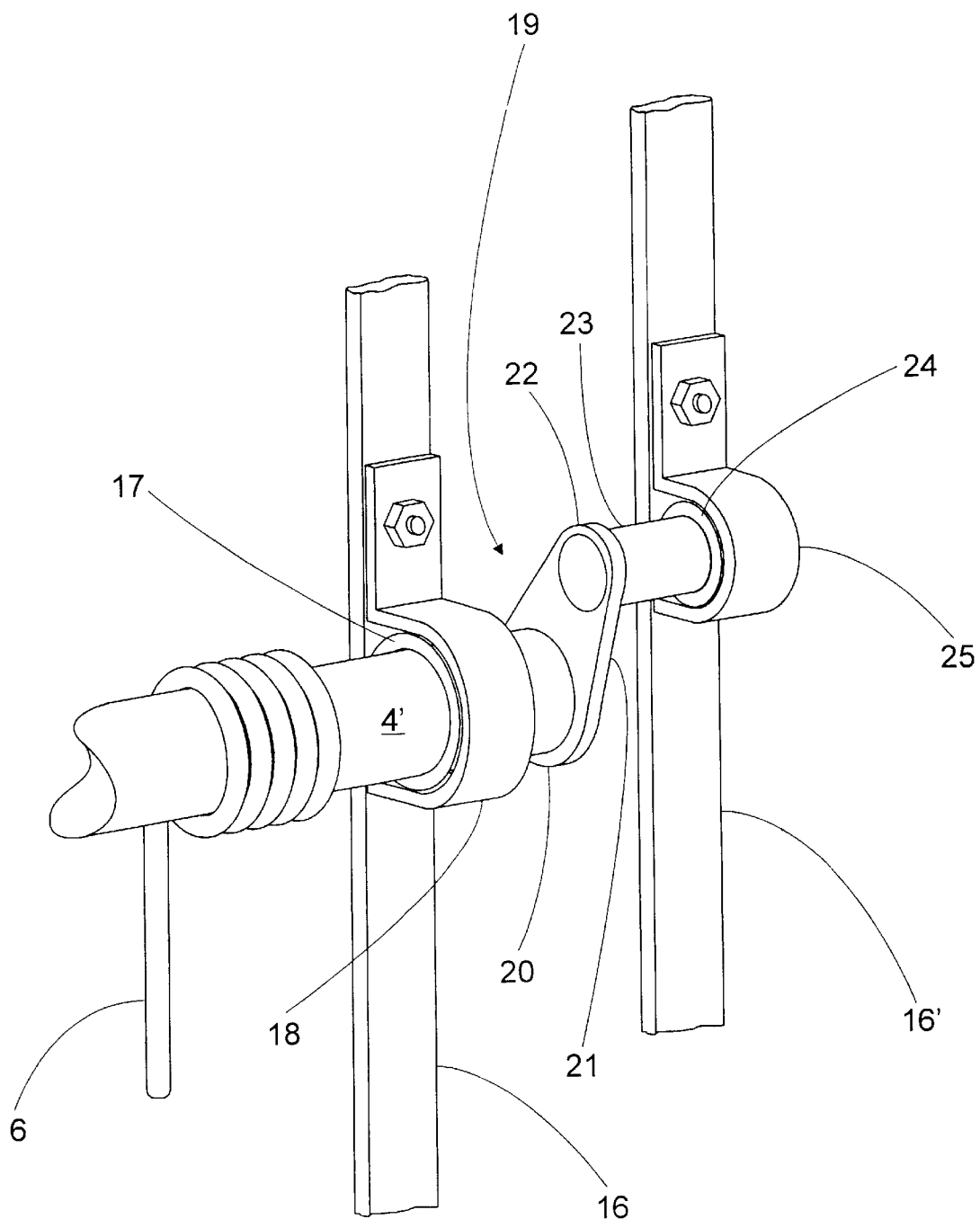
FIG. 4 shows a perspective detailed view of a connection of a cross bar to motion transmission belts.
Figure 5:
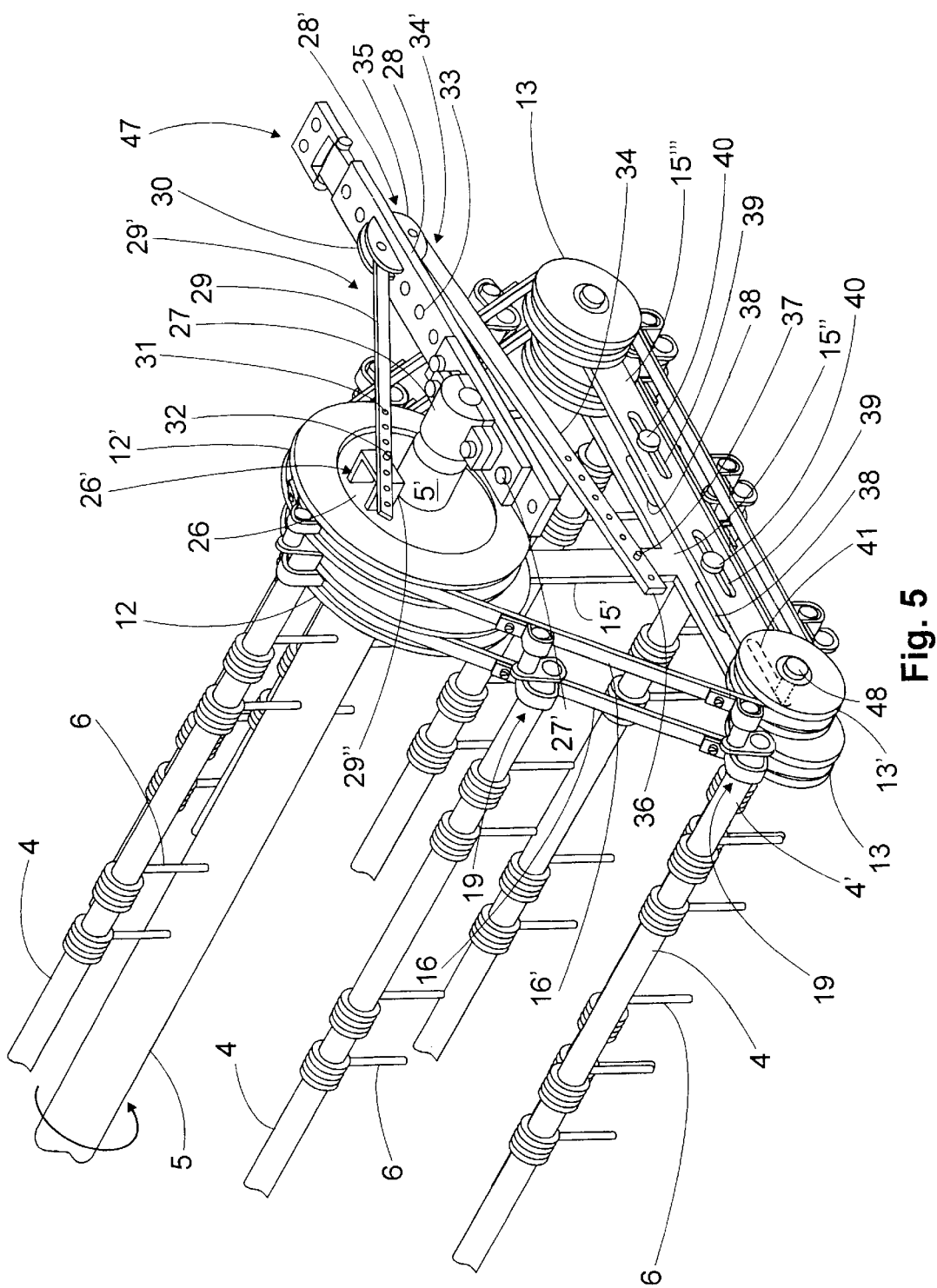
FIG. 5 shows a top-right perspective view of the end shown in FIG. 2 including regulating means for regulating the position of the reel relative to the soil and the remaining mechanisms of the harvesting platform.
Figure 7:
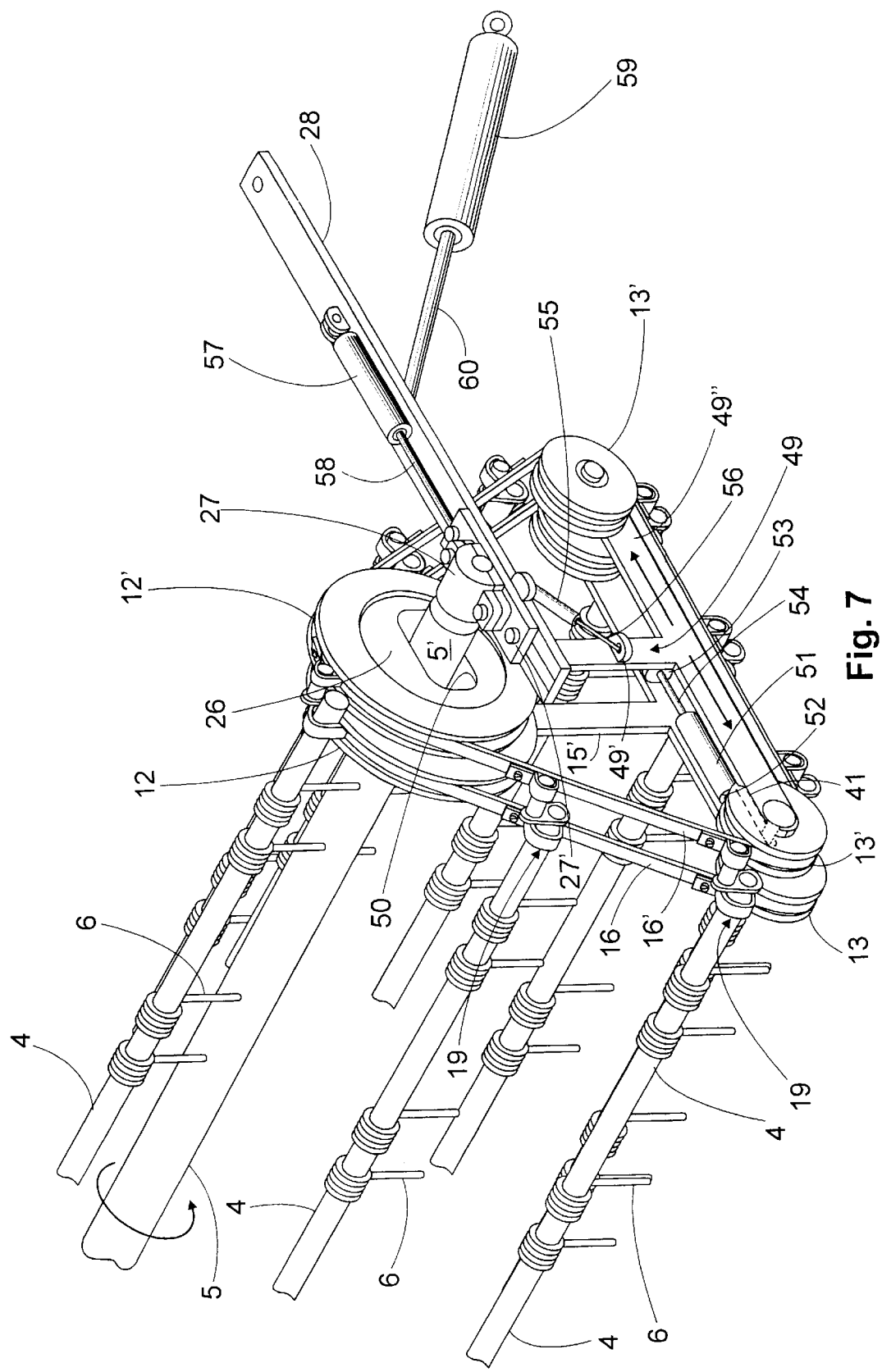
FIG. 7 shows a top-right perspective view of an alternative construction of an end of the reel of the invention, similar to FIG. 5, including alternative regulating means for regulating the position of the reel relative to the soil and the remaining mechanisms of the harvesting platform.

FIGS. 2 and 4 show first end 3' of the reel, with FIG. 2 illustrating the several components of the end without the position regulating means for clarity purposes, with an embodiment of such means being illustrated in FIG. 5 and an alternative regulating means being shown in FIG. 7. Wheels 10 comprise an upper driven wheel 12 and two lower idler wheels 13, the three wheels forming part of a first set of wheels. A motion transmission band 16 runs around wheels 12 and 13 along a closed path or loop. The first set of wheels also comprises a mirror-like arranged plurality of wheels located at the opposite end 3' of the reel and reference thereto will be made later in connection to FIG. 3.

A second set of wheels is provided, which is substantially close and parallel to the first set and upwardly off-set relative to the first set of wheels, the second set comprising an upper idler wheel 12 and two lower idler wheels 13'. It is obvious to any one skilled in the art that all the wheels may be driven in a synchronized system to obtain the desired motion transmission. The first set of wheels is mounted in an end support 15, preferably an inverted T-shaped support or bracket, with the upper driven wheel being at an upper end of the vertical branch of the T, and the idler wheels being each at an opposite end of the horizontal branch of the T. A motion transmission or transferring band 16' runs around wheels 12' and 13' along a closed path or loop. The second set of wheels 12' and 13' may be provided at one or both ends of the reel.

Both sets of wheels have respective triangular configurations and the all the bars have one of their respective ends 4' directly connected to band 16 and indirectly connected to band 16' trough a crank mechanism to which reference will be made in connection to FIG. 4

Figure 14:
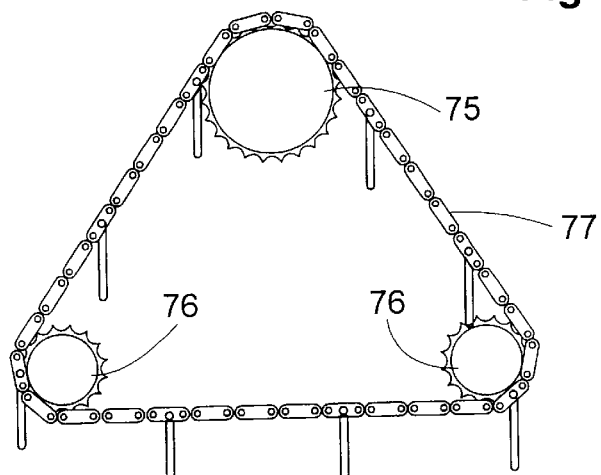
FIG. 14 shows a diagrammatic end view of the reel according to another embodiment of the invention.

At the opposite end of the reel, three wheels namely, an upper driven wheel 42 and a pair of lower idler wheels 43 are provided also forming part of the above cited first set of wheels and a transmission band 44 runs over the three wheels, which also may comprise pulleys as illustrated or sprockets as shown in FIG. 14. The wheels are mounted in an end wheel support or bracket 45, preferably an inverted T-shaped support, with the upper driven wheel being at an upper end of the vertical branch of the T, and the idler wheels being each at an opposite end of the horizontal branch of the T. The opposite ends 4" of the cross bars are connected to belt 44 and journalled in clamps 18, at separate spaced locations to move with the belt in an uniform pattern.

Pulley 42 includes a wheel 46, or a pulley or sprocket, in order to be connected to motion source such as the motion engine of the machine, in order to drive the set of wheels and hence, the reel. While the transmission means from the engine is illustrated as pulley 46 connected to pulley 42, any pulley may be mounted at opposite end 3' or at any portion of shaft 5, if available, depending of the desired design.

According to a basic embodiment of the invention, the reel comprises a plurality of cross bars 4 driven by motion transmission band 16 and/or 44 at one or at respective ends of the reel, the bands running over wheels 12, 13, 42, 43 arranged in a manner to define a desired close path for the bands and cross bars. That is, the second set of wheels 12', 13' would not be necessary except for keeping tines 6 always in a vertical position, or any other fixed position, all around the loop, as it will be explained now in connection to FIG. 4. If wheels 12' and 13' are not provided the tines will radially rotate around bars 4. In other words, if the tines must keep the vertical position when passing along the horizontal lower length of the loop, close to the bottom of the platform, the tines will extend outwardly of the reel but for most of the remaining portions of the loop this behavior being generally not desired. However, if, for any reason, this pattern in the rotation of tines 6 is not a drawback for any kind of plant, the invention is not restricted to the provision of wheels 12' and 13' and the crank mechanism to be disclosed below.

As it is clearly shown in FIG. 4, each end 4' of the bars passes through a bushing or bearing 17 retained against band 16 by a clamp 18. As stated above, this arrangement at both ends of the reel is enough to allow the cross bars to move along the triangular loop around the wheels. However in order to keep tines 6 always vertical at any point of the loop, a plurality of crank pieces 19 are provided along the band with each crank piece being connected to the corresponding end of a cross bar and to adjacent band 16'. End 4' is journaled to band 16 and also is connected to an end 20 of a first arm 21 of piece 19 with a second end 22 of arm 21 being connected to a second arm 23 extending at 90° relative to the first arm and parallel to the cross bar. Arm 23 is journaled into a bearing or bushing 24 retained into a clamp 25 fixed to band 16' of the second set of wheels. In the event that chains are used instead of belts, like the chains of FIG. 14, for example, bushings and clamps may form part of the corresponding links of the chain.

Thanks to the crank pieces 19 connecting the cross bars to both belts 16 and 16' what is combined with the offset positioning between wheels 12, 13 and 12', 13', the tines will be always maintained in the desired position, preferably vertical, along the entire loop formed by the bands around the wheels or pulleys. As it can be seen from FIG. 4, clamp 25 is at an upper level relative to clamp 18 and this relative position is maintained along the entire path of the bands, therefore, arm 21 always is maintained at a substantial vertical position and, since end 4' of the cross bar is fixed to arm 21, the tines also maintain the vertical position. By moving the first set of wheels 12, 13, 42, 43 relative to the second set of wheels 12', 13', the position of tines 6 may be regulated to be maintained with a desired angle relative to the vertical.

Generally, not only the position of the tines independently of the reel can be regulated but the entire reel structure may be adjusted as it will be described below. In addition to the foregoing, all the bands may be kept taut around their respective wheels by any conventional means but preferably, at least one wheel for each band, like one of the lower wheels 13, 13' and 43 may be mounted in sliders at the horizontal arm of the corresponding inverted T-shaped bracket or support, for regulating the wheel position.

The triangular configuration of the reel is preferred in order to have an inclined leading length of the loop to enter into the plants, a bottom substantially horizontal length of the loop to convey the plants towards the cutting means and a rear inclined length to leave the endless collector from a close position to a far position relative to the collector. With the tines in a vertical position, particularly at the bottom length of the band loop, and moving along a path as close to the ground as desired, the plants will be retained, positioned and accompanied appropriately towards the cutters 7.

The regulation of the position of the entire reel relative to the platform and soil is achieved by means an embodiment of which are illustrated in FIG. 5. Upper wheel or pulley 12' is mounted in an end 5' of shaft 5 by means of a bearing plate 26 eccentrically arranged in end 5' of shaft 5 and end 5' is mounted in a bearing, for example a bearing box 27, whereby wheel 12' may rotate free around shaft 5 even when is eccentrically mounted on shaft 5. Plate 26 forms part of a position regulating means also comprising a support bar 28 carrying a bearing box 27 and having a rear portion 28' pivotally connected at 30 to an end 29' of a regulating arm 29.

An opposite end portion 29" of arm 29 is provided with a plurality of orifices 31 and at least a screw 32 selectively passes through one of the orifices 31 for fixing, at a desired position, arm 29 to a bracket 26' of the eccentric plate. Thus, the eccentric plate is moved relative to arm 29 and fixed for regulating the position of the second set of wheels relative to the first set of wheels, also regulating in this way the angular position of the tines relative the soil.

Support bar 28 is provided with a plurality of orifices 33 for selectively receiving screws 27' to connect said bearing box 27 at a desired position along the bar and, hence, for selectively place the reel in a desired position relative to cutting means 7 and collector 8 of the platform.

First end 3' of the reel is also provided with a mechanism for regulating the position of the T-shaped bracket relative the soil. Support bar 28 is pivotally connected at a lower part 35 thereof to a lower arm 34 including a plurality of orifices 36 with at least one screw 37 passing through one desired orifice to fix the lower arm to vertical branch 15' of the T-shaped bracket. Support bar 28 also includes at a rear end thereof a hinge 47 to be connected at the platform structure for providing a pivotal connection of the reel and platform.

Figure 6:
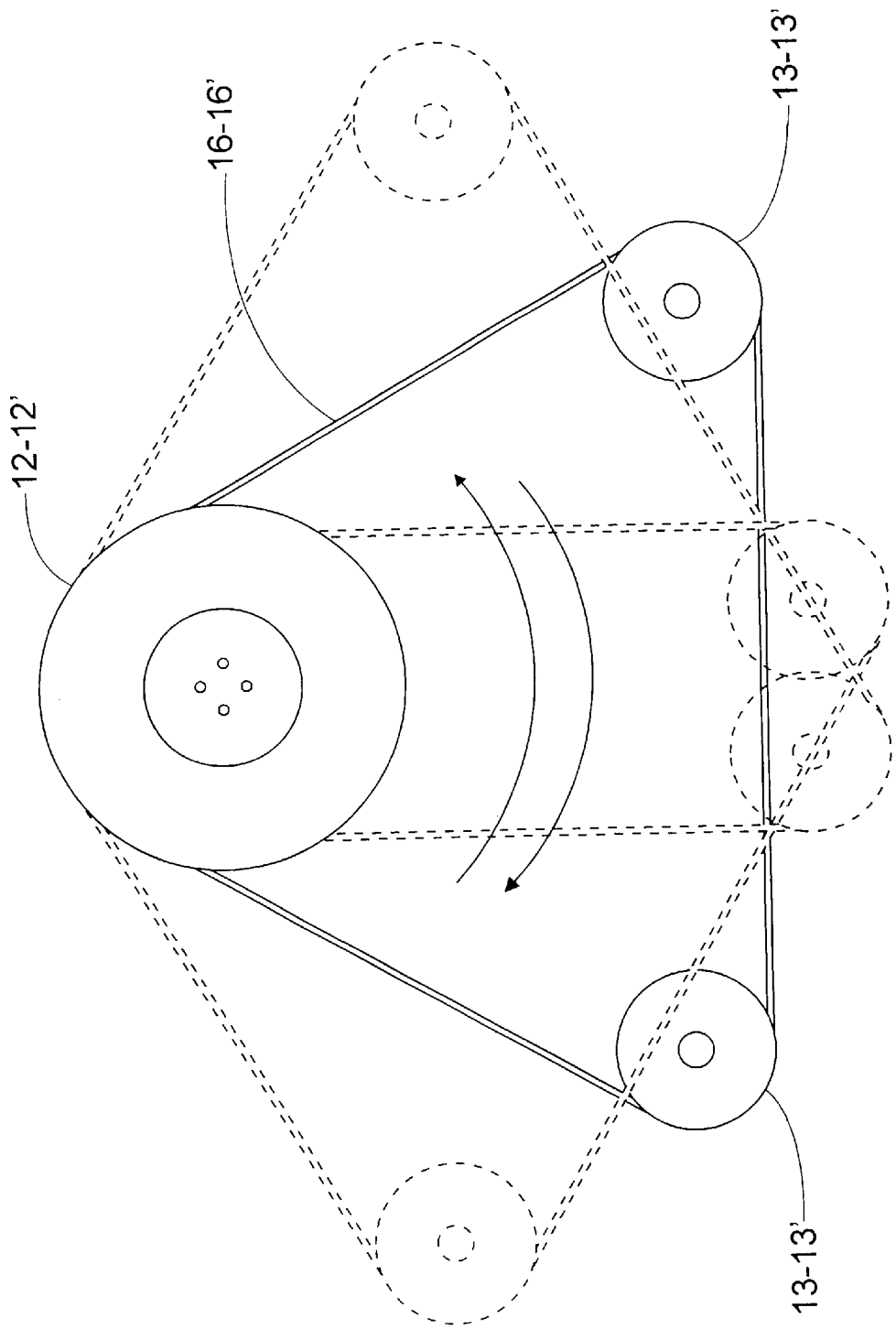
FIG. 6 shows a diagrammatic end view of the reel of FIGS. 1–5 in three angular positions.

Based in the connection between support bar 28, regulating arm 34 and support 15, the angular position of the triangular configured reel may varied as it is shown in phantom lines in FIG. 6. That is, the set of wheels arranged at the ends of the reel may be rotated around shaft 5 in order to modify the working condition of the reel.

In order provide the regulation of wheels 13 and 13' relative to each other, also for accompanying the regulation of plate 26, the horizontal branch of the T-shaped bracket comprises a first branch 15" fixed to vertical branch 15' and a second movable branch 15''' parallel to the first branch, the second branch including elongated regulating orifices 39 receiving screws 40 which in turn are threadably connected to bridges 38 connecting the first branch to the second branch in a manner that the position of the second branch can be regulated relative to the first branch.

In addition to the foregoing, the horizontal branches of the T-shaped brackets may comprise regulating means for regulating the position of at least one of the lower idler wheels, for adjusting the bands tout for example. The regulating means comprise a groove 41 in at least one wheel, the groove receiving a screw 48 to fix the wheel at a desired position.

FIG. 7 shows a simpler regulating mechanism for varying the position of the second set of wheels relative to the first set of wheels and for regulating the position of the entire reel. The same reference numbers will be used to refer to all such components that are the same of FIGS. 1–6. According to this embodiment, wheels 12' and 13" are mounted in a second end support 49 that is connected to alternative regulating means for regulating the position of the second end support relative to end support 15 also called in this embodiment as first end support. Second end support 49, like first support 15 of FIGS. 1–6, comprises an inverted T-shaped bracket with upper wheel 12' being at an upper end of vertical branch 49' of the T, and idler wheels 13' each at an opposite end of horizontal branch 49" of the T. It will be obvious to any person skilled in the art that the T-inverted support may be replaced by another shaped support such as a square or triangular support (not shown).

Wheel 12' is mounted, like in the above described embodiment, in bearing plate 26 but, differing from such embodiment, plate 26 is provided with an elongated orifice 50 for passing through end 5' of shaft 5, whereby plate 26 may be moved relative to shaft 5 and the first set of wheels 12, 13 by regulating means comprising an hydraulic cylinder 51 connected at 52 to support arm 15 ". Cylinder 51 has an extending/retracting rod 54 that is connected to support arm 49' in order to cause a longitudinal relative translation between supports 15 and 49 without any rotation therebetween. The regulating means also comprising a lower hydraulic cylinder 55 connected to box 27, the cylinder having an extending/retracting rod 56 connected to support arm 49' in order to cause the entire reel to move with a pendular movement around shaft 5, as it is shown in FIG. 6. Alternatively, depending on the reel design, rod 56 may be connected to arm 15'. Cylinder 57 is mounted on bar 28, the cylinder having an extending/retracting rod 58 connected to bearing box 27 in order to move the entire reel back and fore and regulate the reel position relative to cutting mechanism 7 and endless collector 8. In addition, two cylinder 59 is connected to the platform structure with a rod 60 connected to bar 28 in order to regulate the height of the reel relative to the ground and/or the platform.

Figure 10:
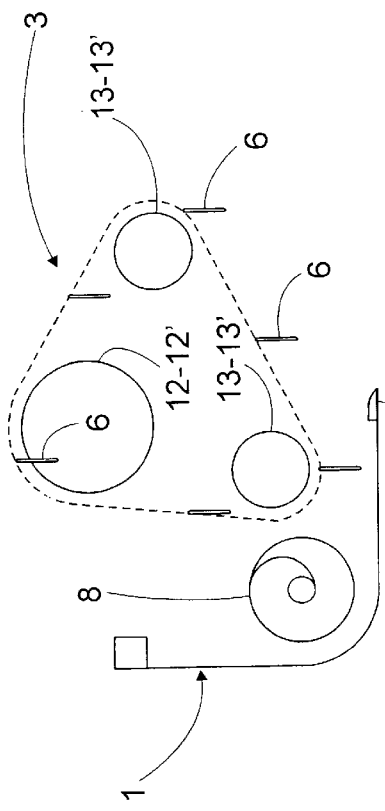
FIGS. 9–11 shows a diagrammatic end view of a reel according to the invention in three different positions in a harvesting platform.
Figure 11:
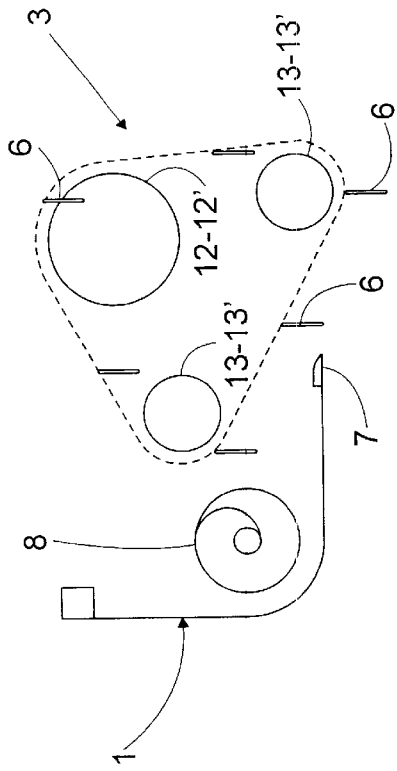
Figure 8:
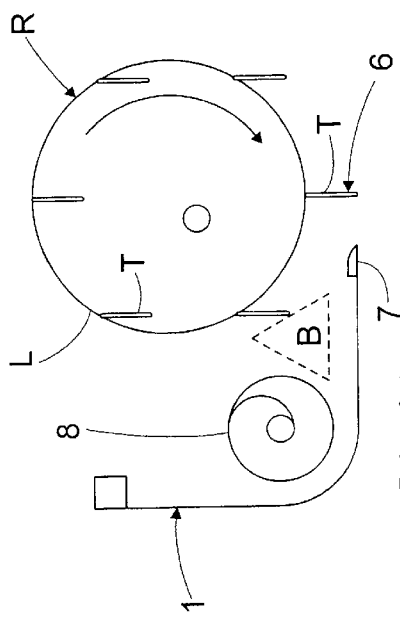
FIG. 8 shows a diagrammatic end view of a reel according to the prior art as it is arranged in a harvesting platform.
Figure 9:
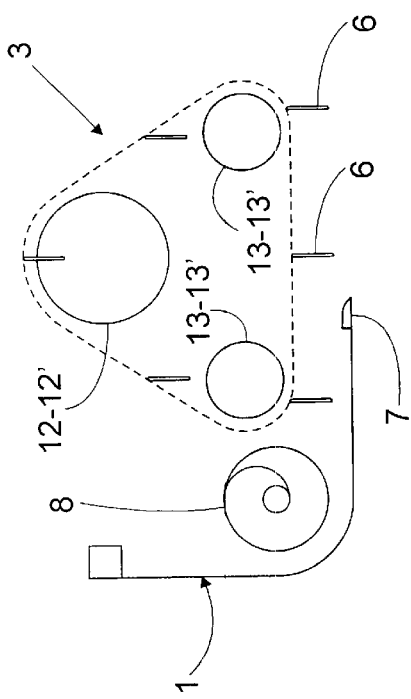

It is to be remarked that the above described position regulating mechanisms provide the inventive reel with extended possibilities of positioning according not only to the ground conditions but also to the status of the plants as it will be described now in reference to FIGS. 8–11. To better appreciate the advantages of the present invention, schematic reference will be made to the operation of a reel of the prior art (FIG. 8) and the inventive reel (FIGS. 9–11). FIG. 8 shows a typical platform and reel assembly of the prior art, the platform, the cutting means and the endless collector being indicated with reference numbers 1, 7 and 8 respectively, like the ones used for describing the invention because platform 1, cutting means 7 and collector 8 may be the same either in the prior art or in the invention, that is the inventive reel may be adapted to any harvester of the prior art.

As it is shown in FIG. 8, reel R comprises a rigid structure generally formed by end hexagonal frames with a plurality of cross bars fixed at their ends to respective end rigid frames. As a consequence of this rigid structure, the bars and, hence tines T, move along a circular path or closed circular loop L with the tines passing at a closer distance to the ground only at a point G without being capable of moving, as it would be desirable, as much as possible along a path parallel to the ground or to the bottom of platform 1, thus leaving a space or volume B, indicated by a phantom triangle, that is not swept by the tines resulting in that the cut plants are frequently blocked (plugging) by excessive accumulation thereof between the rear part of the reel and the endless screw collector/conveyor.

As it is schematically shown in FIGS. 9–11, the inventive reel provides a better manipulation of the upper part of the plants before the cutting of same as well as a better and complete sweeping of the plants once in the platform in order to convey the cut plants towards the endless collector/conveyor thus preventing any undesired accumulation of the plants on the platform.

For normal standing plants the inventive reel may be regulated to be in the position shown in FIG. 10. The position of FIG. 9 is appropriate for plants that are partially tumbled, that is not entirely erected, and the position of FIG. 11 is adapted for plants that are entirely tumbled or fallen down on the soil, wherein the reel is capable of lifting the fallen plants. This is possible thank to the concepts of the invention related to the possibility of having the tines moving along a path or loop with a configuration as desired, depending of the number of wheels, pulleys or sprockets, and the arrangement thereof. While a triangular configuration has shown to be extremely effective, other configurations like the one shown in FIG. 12 may also be desired for certain plant conditions.

Therefore, the inventive reel:
does not beats the plants (even or uneven plants) because the tines do not necessarily move along a circular path;
does not produce blockage of the conveying mechanisms because it may be arranged as close as desired to the endless screw collector, and
the height and inclination of the reel can be varied to accommodate to several types and status of the plants.

FIG. 12 shows another alternative configuration for the inventive reel wherein the band loops are formed by two wheels. Thus, in the first end of the reel two wheels 61, 62 with a transmission band 63 running around the same, and two wheels 64, 65 with a similar band 66 are provided to work in a manner like the triangular configuration with three wheels per each band. In order to keep the tines always at a desired orientation, crank pieces 19, like the ones shown in FIG. 4, also may be provided.

Figure 13:
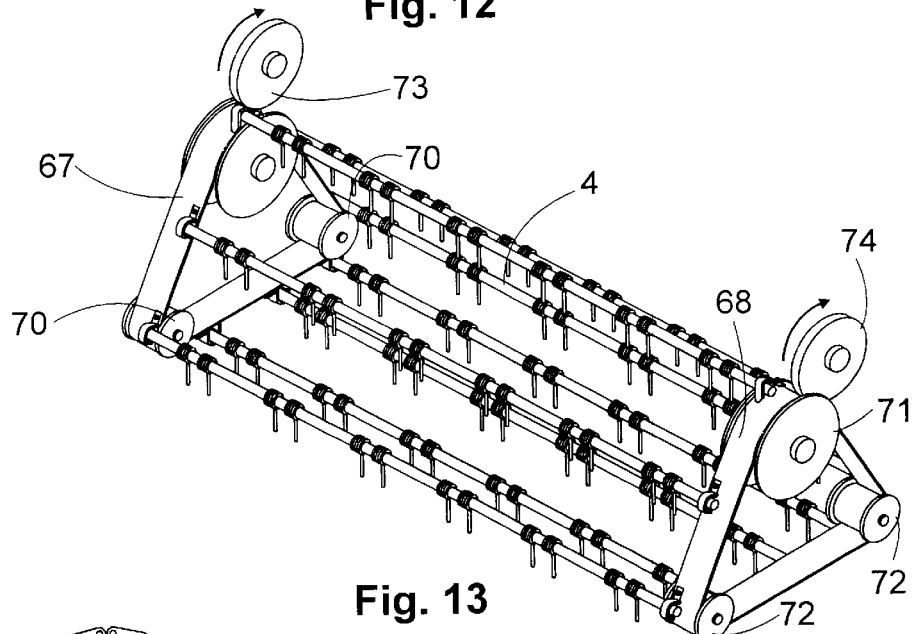
FIG. 13 shows a top-right perspective view of an another embodiment of the reel of the invention, with three wheels actuated by driving wheels instead of the driving shaft of FIGS. 1–5.

Even according to another alternative embodiment of the invention, the reel may comprise, as it is diagrammatically illustrated in FIG. 13, a plurality of cross bars 4 with the ends of the cross bars connected to transmission bands 67, 68, such as belts or chains, running around a first set of wheels comprising upper wheels 69, 71 and lower wheels 70, 72. Differing from the embodiment of FIGS. 1–7, no driving shaft is provided and, instead, upper wheels 69, 71 may be connected to driving wheels 73, 74, either by friction engagement or by meshing in the event that gears or chains and sprockets are used.

As it was already remarked above, all the embodiments described in the present application have been shown with wheels or pulleys and belts running around them, however in replacement thereof, sprockets and chains can be used. FIG. 14 diagrammatically shows a reel end comprising an upper sprocket 75, preferably a driven sprocket, either connected to shaft 5 or to any other driving means like wheels or sprockets 73, 74 of FIG. 12, and two lower idler sprockets 76 with a chain 77 running around the sprockets for motion transmission. This assembly may be easily employed, according to the invention, in any of the above reel configurations and structures.

While the reel has been illustrated as formed by only one module comprising two ends 3' and 3" and a plurality of cross bars extending between these ends in a module, one or more modules may be applied to a platform, axially arranged or offset to each other, depending on the size and other characteristics of the harvesting machine. Furthermore, while a pulley 46 has been illustrated in an end of the reel for getting motion from the machine, one or more pulleys or sprockets may be provided with this purpose at any point of the length of the reel or between two adjacent reel modules.

While preferred embodiments of the present invention have been illustrated and described, it will be obvious to those skilled in the art that various changes and modifications may be made therein without departing from the scope of the invention as defined in the appended claims.

I claim:

1. A reel for harvesting machines of the type including a platform with crop cutting means, the reel comprising:
   at least one driving shaft connected to motor means of the machine, the shaft having opposite ends supported by bearing means mounted to the platform;
   a plurality of cross bars including projecting tines and connected to end motion transmission bands arranged on at least a first end and a second end of the reel, the bands running on wheels arranged in a manner to define a closed motion path for the bands and cross bars;
   the first end of the reel including:
      a first set of wheels connected to the driving shaft;
      a second set of wheels connected to the first set of wheels;
      a first end support for mounting the first set of wheels, the first end support being pivotally mounted around the driving shaft;
      a second end support for mounting the second set of wheels, the second end support being pivotally mounted around the driving shaft; and
      a regulating mechanism for pivotally moving the end supports around the driving shaft and for moving the first end support relative to the second end support, whereby the first set of wheels are moved relative to the second set of wheels for changing the angular position of the tines.

2. The reel of claim 1, wherein the second end of the reel includes said first end support with said first set of wheels.

3. The reel of claim 2, wherein the bands are selected from belts and chains, and the wheels are selected from pulleys and sprockets.

4. The reel of claim 3, wherein the first set of wheels comprises an upper driven wheel and two lower idler wheels, the band running over the three wheels forming a triangular configuration, said first end support comprises an inverted T-shaped bracket with the upper driven wheel being at an upper end of the vertical branch of the T, and the idler wheels are each at an opposite end of the horizontal branch of the T.

5. The reel of claim 4, wherein the second end support comprises an inverted T-shaped bracket with the upper wheel being at an upper end of the vertical branch of the T, and the idler wheels are each at an opposite end of the horizontal branch of the T.

6. The reel of claim 4, wherein the second set of wheels is upwardly off-set relative the first set of wheels, the second set of wheels comprising an upper idler wheel and two lower idler wheels, a motion transferring band running over the three wheels of the second set, the second set of wheels having a triangular configuration parallel to the triangular configuration of the first set of wheels, the band of the first set and the band of the second set being connected to each other by a plurality of crank pieces, each crank piece also being connected to an end of a cross bar.

7. The reel of claim 6, wherein each bar has opposite ends and, at the first end of the reel, the end of each cross bar is journaled in a clamp fixed to the band of the first set of wheels and connected to a first arm of the crank piece, a second arm of the crank piece, extending at 90° relative to the first arm and parallel to the cross bar, being journaled into a clamp fixed to the band of the second set of wheels.

8. The reel of claim 7, wherein the ends of the cross bars are journaled into clamps fixed to the transmission bands at the ends of the reel.

9. The reel of claim 6, wherein the bearing means for supporting the ends of the driving shaft comprises a bearing housed in a bearing box connected to a support bar at each end of the driving shaft, the support bar being pivotally connected to the platform and having a plurality of orifices for selectively connecting said bearing box to the support bar and, hence, for selectively place the reel in a desired position relative to the cutting means of the platform.

10. The reel of claim 9, wherein the upper wheel of the second set of wheels comprises a bearing plate having an elongated orifice eccentrically arranged in the bearing plate, with an end of the driving shaft passing freely through the elongated orifice for permitting the movement of the bearing plate and the upper wheel over and relative to the driving shaft, the second end support being connected to said regulating mechanism for moving the second set of wheels relative to the first set of wheels for regulating the angular position of the tines relative the soil.

11. The reel of claim 9, wherein the upper wheel of the second set of wheels comprises a bearing plate freely rotatably and eccentrically arranged on an end of the driving shaft for permitting the free movement of the bearing plate and the upper wheel around the driving shaft, the bearing plate being connected to said regulating mechanism for moving the upper wheel relative to the first set of wheels for regulating the angular position of the tines relative the soil.

12. The reel of claim 11, wherein the support bar has a rear portion pivotally connected to an end of a regulating arm for regulating the angular position of the bearing plate, said regulating arm having an opposite end provided with a plurality of orifices, a screw selectively passing through one of the orifices to fix the arm to the bearing plate.

13. The reel of claim 12, the regulating mechanism including a lower arm pivotally connected to the support bar, the lower arm including a plurality of orifices with a screw passing through one desired orifice to fix the lower arm to the vertical branch of the T-shaped bracket.

14. The reel of claim 13, wherein the horizontal branch of the T-shaped bracket comprises a first branch fixed to the vertical branch and a second movable branch parallel to the first branch, the second branch including elongated regulating orifices receiving screws which in turn are threadably connected to bridges connecting the first branch to the second branch in a manner that the position of the second branch can be regulated relative to the first branch.

15. The reel of claim 14, wherein the horizontal branches of the T-shaped brackets comprise regulating means for regulating the position of at least one of the lower idler wheels, the regulating means comprise a groove for each wheel, the groove receiving a screw to fix the wheel at a desired position.

16. The reel of claim 1, wherein the regulating mechanism comprises at least one expanding/retracting cylinder connected to the first and second end supports.

17. The reel of claim 1, wherein, the regulating mechanism comprises at least one expanding/retracting cylinder for pivotally moving the end supports around the driving shaft and at least one expanding/retracting cylinder connected between the end supports for moving the end supports relative to each other.

18. The reel of claim 1, wherein, the first and the second end supports being connected to regulating means for horizontally moving the end wheel supports and the driving shaft back and fore, the regulating mechanism comprising at least one expanding/retracting cylinder.

19. The reel of claim 1, wherein, the first and the second end supports being connected to regulating means for vertically moving the end wheel supports and the driving shaft up and down, the regulating mechanism comprising at least one expanding/retracting cylinder.

* * * * *